US006217480B1

(12) United States Patent
Iwata et al.

(10) Patent No.: US 6,217,480 B1
(45) Date of Patent: *Apr. 17, 2001

(54) ENGINE CONTROL

(75) Inventors: Yoshibumi Iwata; Kuzuhiro Nakamura, both of Hamamatsu (JP)

(73) Assignee: Sanshin Kogyo Kabushiki Kaisha, Hamamatsu (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/957,981

(22) Filed: Oct. 21, 1997

(30) Foreign Application Priority Data

Oct. 21, 1996 (JP) ........................................ 8-278093

(51) Int. Cl.[7] ........................................ B60K 41/04

(52) U.S. Cl. ........................................ 477/107; 477/111

(58) Field of Search ........................................ 477/107, 110, 477/111, 113; 123/198 F, 481, 333, 335

(56) References Cited

U.S. PATENT DOCUMENTS

| | | | | |
|---|---|---|---|---|
| 4,194,417 | * | 3/1980 | Kato et al. | 477/111 X |
| 4,227,505 | * | 10/1980 | Larson et al. | 477/111 X |
| 4,437,442 | * | 3/1984 | Yamaguchi | 477/111 |
| 4,459,960 | * | 7/1984 | Ueno et al. | 123/481 |
| 4,512,321 | * | 4/1985 | Yamato | 123/493 |
| 4,535,744 | * | 8/1985 | Matsumura | 123/481 X |
| 4,606,315 | | 8/1986 | Tobinaga et al. . | |
| 4,768,474 | | 9/1988 | Fujimoto et al. . | |
| 4,846,127 | * | 7/1989 | Miyama et al. | 123/333 X |
| 4,903,662 | | 2/1990 | Hirukawa et al. . | |
| 5,048,372 | * | 9/1991 | Sodeno et al. | 477/111 X |
| 5,062,401 | | 11/1991 | Suganuma . | |
| 5,105,779 | * | 4/1992 | Thompson | 123/198 F |
| 5,117,792 | | 6/1992 | Kanno . | |
| 5,119,781 | * | 6/1992 | Trombley et al. | 123/481 X |
| 5,387,163 | * | 2/1995 | Sakamoto et al. | 477/111 X |
| 5,425,335 | * | 6/1995 | Miyamoto et al. | 123/198 F |
| 5,476,426 | | 12/1995 | Nakamura et al. . | |
| 5,584,266 | | 12/1996 | Motose et al. | 123/198 F X |
| 5,606,952 | * | 3/1997 | Kanno et al. | 123/406.74 |
| 5,634,868 | * | 6/1997 | Weber et al. | 477/107 |
| 5,645,032 | | 7/1997 | Motose | 123/481 X |
| 5,669,349 | | 9/1997 | Iwata et al. | 123/335 |
| 5,685,800 | * | 11/1997 | Toukura | 477/111 X |
| 5,694,909 | | 12/1997 | Kato . | |
| 5,720,257 | | 2/1998 | Motose et al. | 123/481 X |
| 5,758,616 | * | 6/1998 | Motose | 123/198 F |

* cited by examiner

*Primary Examiner*—Charles A Marmor
*Assistant Examiner*—Roger Pang
(74) *Attorney, Agent, or Firm*—Knobbe, Martens, Olson & Bear LLP

(57) ABSTRACT

An engine control for an internal combustion engine is disclosed. The engine preferably includes at least two cylinders or combustion chambers. The engine control is arranged to run the engine in a first mode in which all cylinders are operating and a second mode in which at least one of the cylinders is disabled, such as by misfiring the ignition element corresponding thereto. The engine control is arranged to operate the engine in the second mode only when a predetermined condition, such as idle, is detected for a predetermined amount of time. The engine control is also arranged to prevent the operation of the engine in the second mode if an engine operating condition has changed states, even if the predetermined condition is detected.

2 Claims, 7 Drawing Sheets

ENGINE CONTROL

FIELD OF THE INVENTION

The present invention relates to an engine control. More particularly, the present invention is an engine control in which one or more cylinders of the engine are disabled during one or more operating conditions.

BACKGROUND OF THE INVENTION

It is well known to use an electronic engine control to control various aspects of an internal combustion engine. As one example, engine controls are often used to control the ignition circuit which fires an ignition element corresponding to each cylinder of the engine. In such an arrangement, the engine control may be used to adjust the timing of the firing of the ignition element and thus advance or retard the ignition based on an operating condition of the engine.

Along these same lines, the engine control may be used to entirely prevent the firing of the ignition element of one or more cylinders or to so substantially adjust the timing of the firing to misfire one or more cylinders under certain operating conditions. This prevention of firing or substantial misfiring is generally referred to as cylinder disabling, since combustion does not occur in the cylinder at all or occurs at a time which is ineffective in powering the engine.

It has been proposed to use the cylinder disabling feature when the engine is idling. When the engine is idling, the firing of some but not all of the cylinders has the advantage that engine temperature is reduced since combustion is not occurring in one or more of the cylinders. When fuel is not supplied to the disabled cylinder(s), the fuel consumption rate of the engine is also advantageously decreased.

A significant disadvantage to such a cylinder disabling strategy is that the operator of the engine has no control over whether the control unit operates the engine in a disabling mode. In general, the control is arranged to operate the disabling mode anytime an indicator of engine idling is provided. In some instances, however, this indication may be provided when in fact the operator of the engine desires a high engine power output.

It is an object of the present invention to provide an engine control which employs a cylinder disabling mode at certain engine idle conditions, but which is arranged to prevent operation of the cylinder disabling mode during certain other conditions.

SUMMARY OF THE INVENTION

The present invention is an engine control for an engine. Preferably, the engine is of the internal combustion type and includes at least two cylinders or combustion chambers.

The engine control includes means for disabling at least one of the cylinders. In the preferred embodiment, the means for disabling is not activated until a predetermined condition is detected for a predetermined time. Preferably, the means for disabling is not activated unless an idle condition of the engine is detected for a predetermined time.

In still a further embodiment of the engine, the engine is operable in first and second states and the means for disabling may also be activated even if the predetermined time has not passed if the state of the engine has not changed. Preferably, this first and second states comprise a drive state of the engine relative to a water propulsion device.

In an alternate embodiment, the engine is arranged to power a water propulsion device of an outboard motor propelling a watercraft and the means for disabling is not activated unless the speed of the watercraft is below a predetermined speed.

Advantageously, the engine control of the present invention is arranged to operate the engine in a cylinder disabling mode only upon the occurrence of certain conditions. Thus, the disabling mode is not activated when, for example, the engine is enters an idle mode only for a short period of time.

Further objects, features, and advantages of the present invention over the prior art will become apparent from the detailed description of the drawings which follows, when considered with the attached figures.

DETAILED DESCRIPTION OF THE PREFERRED EMBODIMENTS OF THE INVENTION

Figure 1:
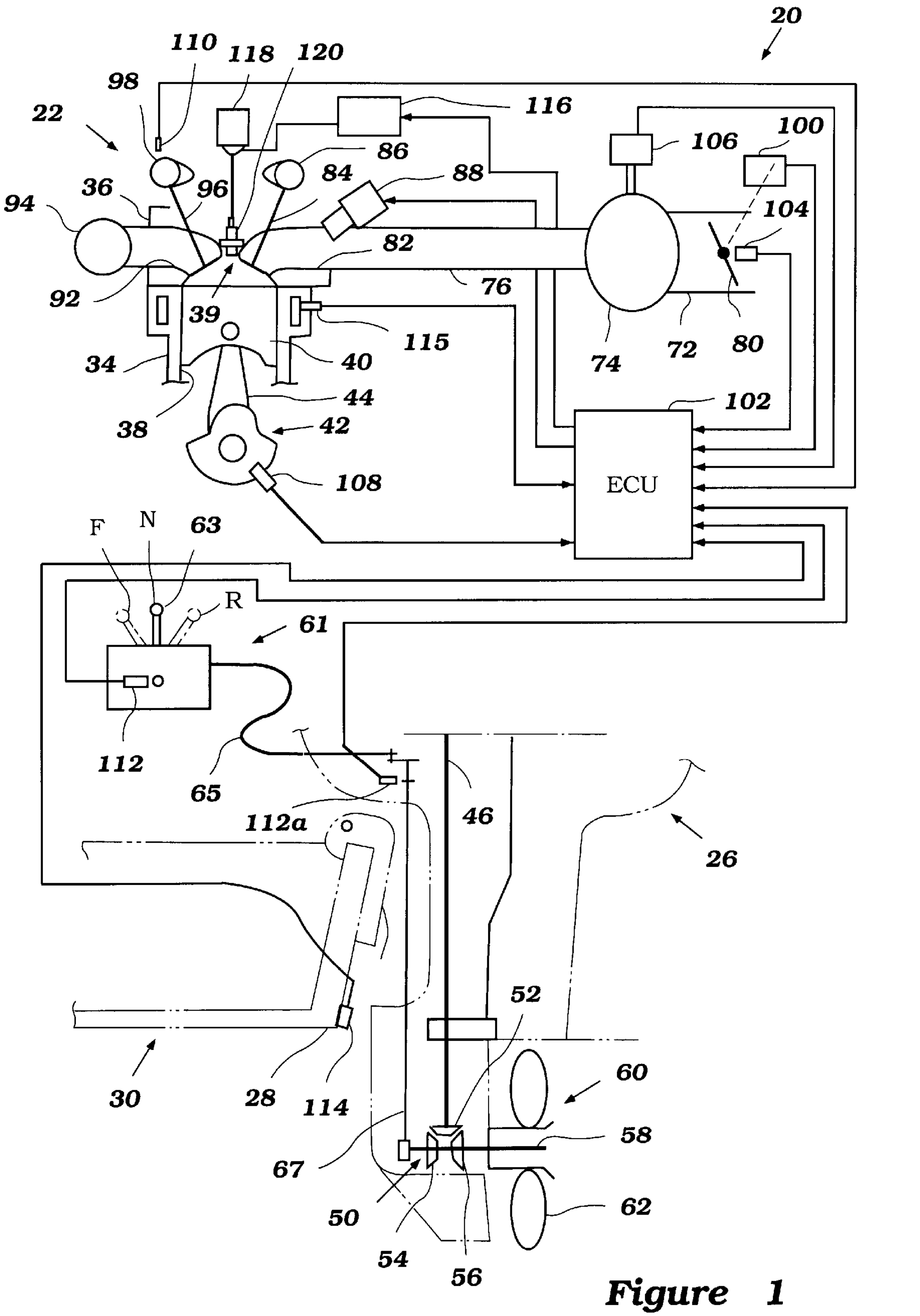
FIG. 1 schematically illustrates an engine powering an outboard motor and having a control in accordance with the present invention.
Figure 2:
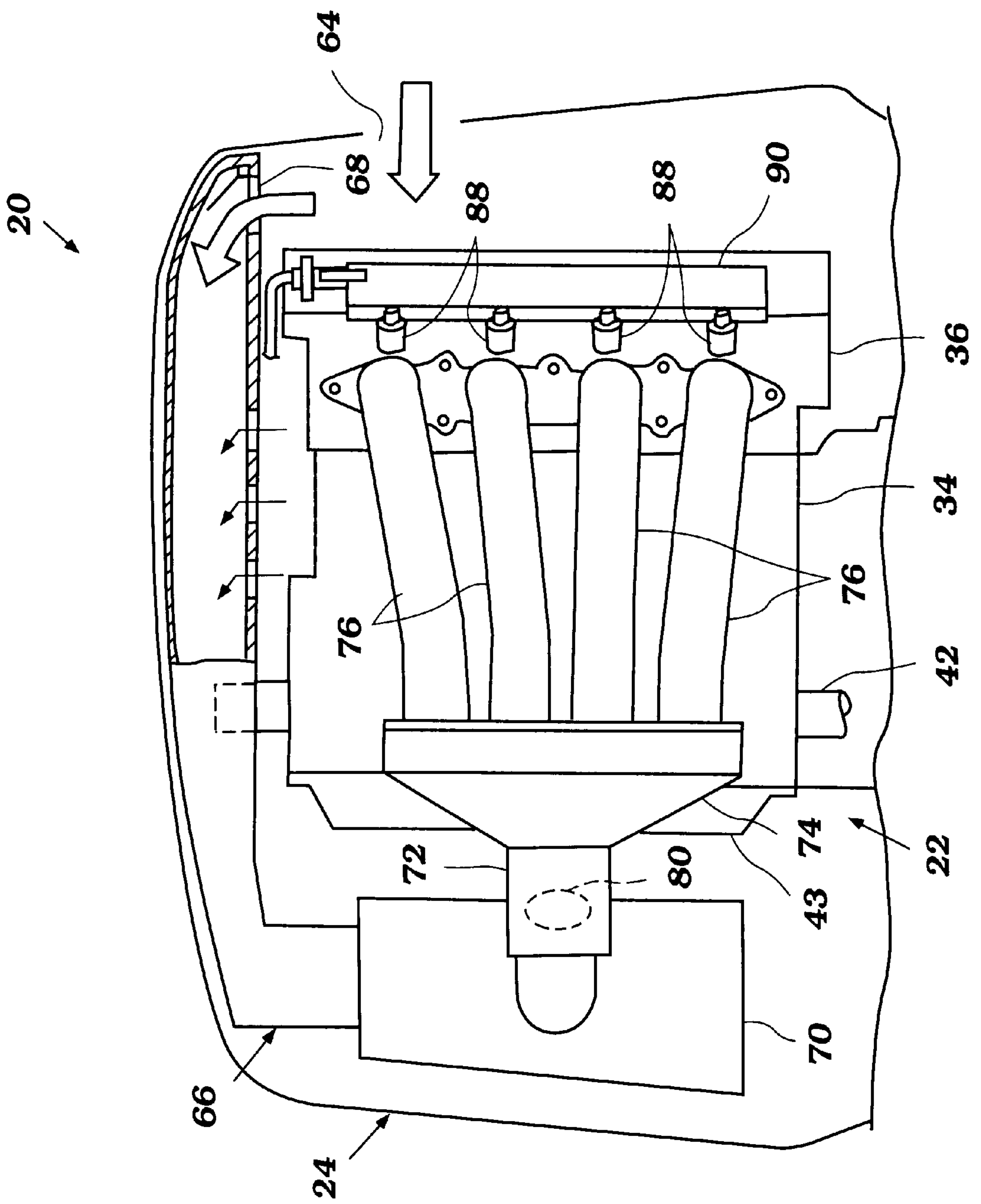
FIG. 2 is a cross-sectional view of a top portion of the motor and illustrated in FIG. 1 exposing a portion of the engine positioned in a cowling thereof.

FIGS. 1 and 2 illustrate an outboard motor 20 powered by an engine 22 controlled with an engine control in accordance with the present invention. The control of the present invention is described with an engine 22 utilized to power an outboard motor 20 since this is an application with which an engine controlled with the control has particular utility. As may be appreciated by one skilled in the art, the engine control may be used to control an engine used in a variety of other applications.

In general, and as described in more detail below, the engine control of the present invention is arranged to selectively disable one or more cylinders of the engine dependent on one or more operating conditions.

Referring to FIGS. 1 and 2, the outboard motor 20 has a powerhead which comprises the engine 22 positioned in a cowling 24. A lower unit 26 extends below the powerhead. The outboard motor 20 is connected to the hull 28 of a watercraft 30, preferably at a transom portion of the watercraft 30. The motor 20 is connected to the watercraft 30 by a clamping bracket 32. Preferably, the motor 20 is connected to the clamping bracket 32 in a manner which permits side-to-side movement about a vertically extending axis for permitting steering of the watercraft 30 with the motor, and in a manner which permits movement up and down about a horizontally extending axis for permitting trimming of the motor 30. These mountings are well known to those skilled in the art.

The engine 22 includes a cylinder block 34 having a cylinder head 36 connected thereto and cooperating therewith to define four cylinders 38, each cylinder including a combustion chamber portion 39. As is known to those skilled in the art, the engine 22 may have a greater or lesser number of cylinders 38 than four.

In the present embodiment, a piston 40 is movably mounted in each cylinder 38. Each piston 40 is connected to a crankshaft 42 which is journalled for rotation with respect to the remainder of the engine 22 via a connecting rod 44. The crankshaft 42 is preferably positioned in a crankcase chamber defined by the block 34 opposite the cylinder head 36 and enclosed with a crankcase cover 43.

The crankshaft 42 is generally vertically extending, and likewise the cylinders 38 are preferably arranged in in-line vertical fashion. As known to those skilled in the art, the engine 22 may be arranged in other orientations, such as a "V" arrangement. In addition, the engine 22 may be of the rotary type.

As illustrated in FIG. 1, the crankshaft 42 is preferably arranged to drive a drive shaft 46 which extends through the lower unit 26 of the motor 20 to drive a means for propelling water. In the embodiment illustrated, the drive shaft 46 extends to a forward-neutral-reverse transmission 50. This transmission 50 may be of a variety of types. As illustrated, the transmission 50 includes a bevel gear 52 mounted on the end of the drive shaft 46 for selective engagement with forward and reverse bevel gears 54,56 mounted on a propeller drive shaft 58. The propeller drive shaft 58 extends to the means for propelling water, which in the present invention is illustrated as a propeller 60 having at least one blade 62.

A shift mechanism 61 is provided for permitting the operator of the watercraft 30 to shift the transmission 50 between forward, neutral and reverse positions. As illustrated, the mechanism 61 includes a shift lever 63 moveable between F, N and R positions corresponding to forward, neutral and reverse transmission positions, respectively. The shift lever 63 is connected via a shift cable 65 to a shift rod 67 extending through the lower unit 26 of the motor 20 to the transmission 50. As illustrated, the shift rod 67 is arranged to rotate and move the forward and reverse bevel gears 54,56 into selective engagement with the bevel gear 52 on the drive shaft (or into a position in which neither gear 54,56 engages the bevel gear 52 in a neutral position).

Air is provided to each cylinder 38 for use in a fuel combustion process. Referring to FIG. 2, air is drawn through a vent 64 in the cowling 24 of the motor 20. The air entering the cowling 24 is then drawn into an inlet 68 into an intake system 66. In the embodiment illustrated, the air is routed through a passage extending across the top of the engine 22 to a surge tank 70.

Air is drawn from the surge tank 70 through a throttle body 72 and delivered into a manifold 74 which includes individual runners 76 corresponding to each cylinder 38. The rate of air flow to the cylinders 38 of the engine 22 is preferably governed by a throttle plate 80 movably mounted in a passage through the throttle body 72. This plate 80 is preferably remotely movable by an operator of the watercraft 30 from a position in which the plate 80 generally obstructs the passage and other positions in which the throttle plate 80 generally does not obstruct the passage.

Each runner 76 has a passage 82 therethrough leading to an intake port of a cylinder 38. As illustrated in FIG. 1, means are provided for controlling the timing of the flow of air into each cylinder 38. Preferably, this means comprises an intake valve 84 having one end positioned in the intake port. The valve 84 is preferably actuated between one position in which is obstructs or closes the-port and a second position in which the port is opened by an intake camshaft 86.

Preferably, the intake camshaft 86 is arranged to actuate the intake valve 84 corresponding to all of the cylinders 38. Means are provided for driving the camshaft 86, as well known in the art. For example, this means may comprises a chain or belt extending from the crankshaft 42 to the camshaft 86 whereby the crankshaft 42 drives the camshaft 86.

Fuel is also supplied to the cylinder 38 for combustion therein. Preferably, the fuel is supplied through a suitable charge former, such as a fuel injector 88. As illustrated, a fuel injector 88 is provided corresponding to each runner 76 and delivers fuel into the air passing through the passage 82 corresponding thereto.

Fuel is supplied to each fuel injector 88 by a fuel supply system which preferably includes means for delivering fuel from a supply to the injector 88 at high pressure. The fuel is preferably supplied to the injectors 88 through a fuel rail 90 extending generally vertically along the cylinder head 38 of the engine 22.

Products of the combustion process are routed from each cylinder 38 through an exhaust port leading to an exhaust passage 92. The exhaust passage 92 leading from each cylinder 38 preferably extends to a common exhaust passage 94 leading to a point external to the motor 20.

Means are provided for controlling the flow of exhaust from each cylinder 38 to its respective exhaust passage 92. Preferably, this means comprises an exhaust valve 96 having one end position in the exhaust port. The exhaust valve 96 is moveable between a first position in which it obstructs or closes the exhaust port and prevents the flow of exhaust therethrough, and a second open position in which exhaust is permitted to flow from the cylinder 38 to the exhaust passage 92. Preferably, the valve 96 is actuated by an exhaust camshaft 98. The camshaft 98 is preferably driven in like manner to the intake camshaft 86.

The details of the remainder of the exhaust system are not provided herein as they form no part of the present invention, and are well known to those skilled in the art.

Figure 3:
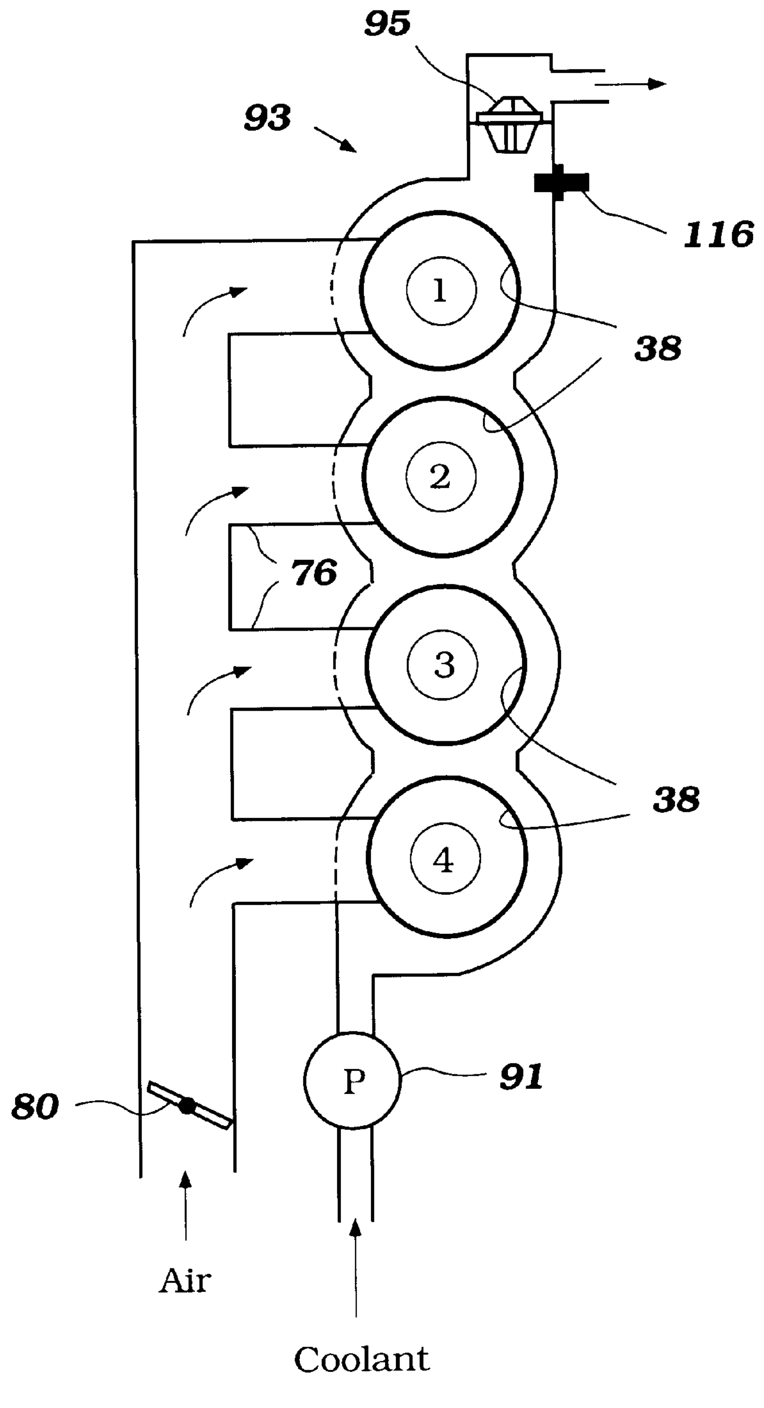
FIG. 3 schematically illustrates a portion of the intake and cooling systems for the engine illustrated in FIG. 1.

The engine 22 preferably includes a cooling system. As illustrated in FIG. 3, cooling water is preferably supplied by a pump 91 to a cooling jacket 93 surrounding at least a portion of each cylinder 38. The coolant may be water in which the motor 20 is operating drawn through an inlet.

The coolant flows through the jacket 93 and, selectively, to a discharge. Preferably, a thermostat 95 controls the flow of coolant from the jacket 93 to the discharge. The thermostat 95 is arranged to stop the flow of coolant to allow the engine 22 to warm up, and to permit coolant to flow freely through the jacket 93 when the engine temperature is high, as is well known to those skilled in the art.

The engine 22 includes an engine control for controlling various engine functions. Preferably, the engine control is of the type which receives information from various sensors and utilizes the data from the sensor to control the engine functions. As illustrated in FIG. 1, a throttle position sensor 100 preferably provides data regarding the position of the throttle plate 80 to an ECU 102 of the engine control. An idle sensor or switch 104 is arranged to indicate to the ECU 102 when the throttle plate 80 is moved to an idle position, i.e., a position in which the plate 80 generally obstructs the passage, restricting the flow of air and slowing the engine speed.

An intake air pressure sensor 106 in communication with the intake system 74 provides air pressure data to the ECU 102. A crankshaft angle sensor 108 is provided for monitoring the speed and angle of the crankshaft 42, and a cylinder distinguishing sensor 110 is preferably provided for determining the position of the piston 40 of at least one of the cylinders 38. As is known to those skilled in the art, by knowing the position of one of the pistons 40 and the angular position of the crankshaft 42 it is possible to determine the position of the piston of every cylinder 38 of the engine 22.

Figure 4:
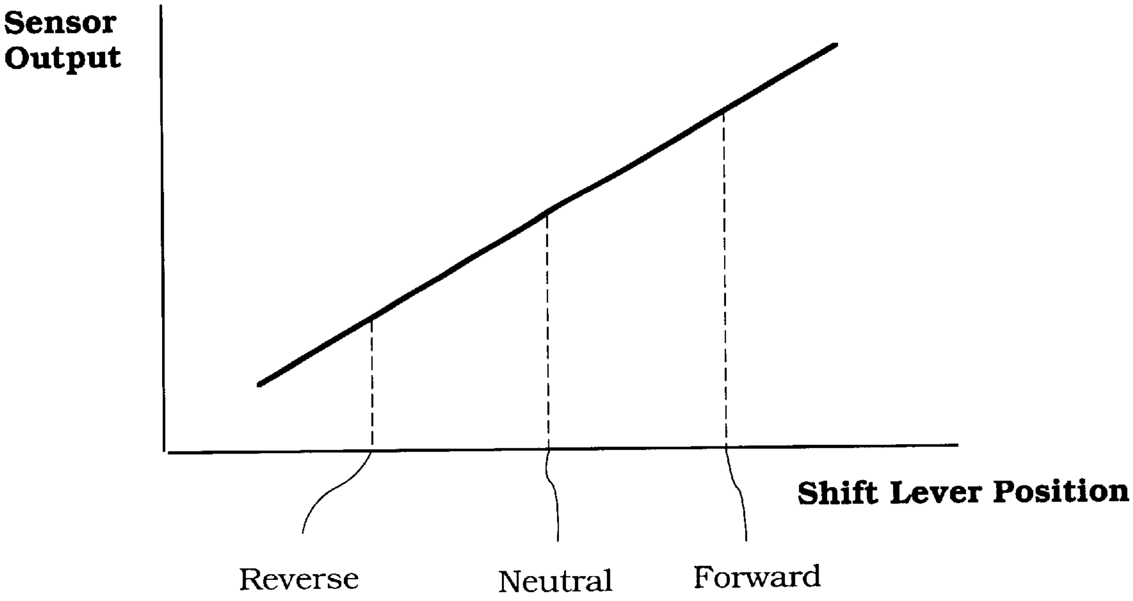
FIG. 4 graphically illustrates the output of a first transmission shift sensor of the engine control.
Figure 5:
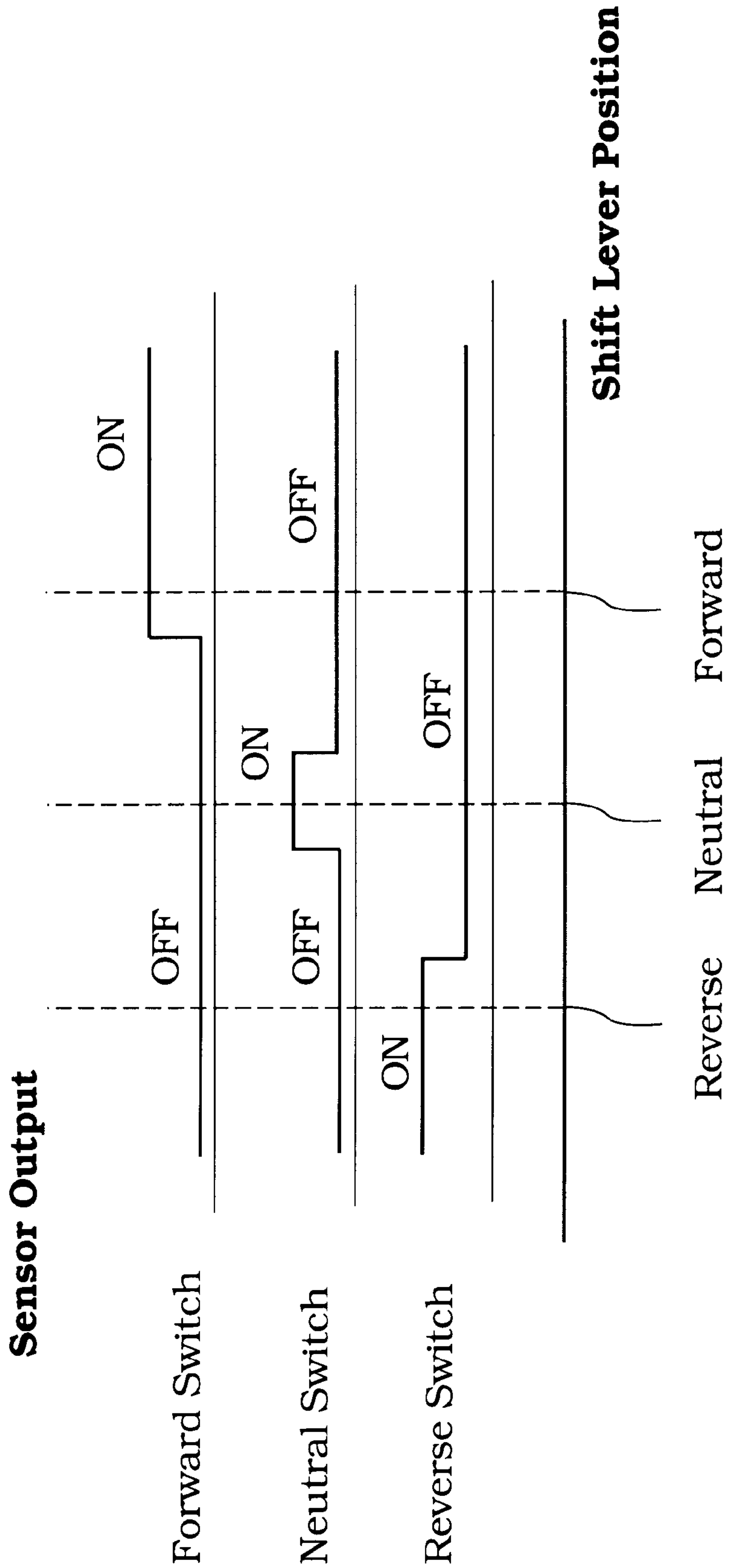
FIG. 5 graphically illustrates the output of a second transmission shift sensor of the engine control.

A shift lever position sensor 112 is provided for sensing the position of the shift lever 63 in its F, N or R positions and sending the position data to the ECU 102. This type of sensor 112 is preferably arranged to provide a unique signal indicative of each of the three shifter positions, as best illustrated in FIG. 5. In the alternative, a shift position sensor 112*a* may be provided for determining the rotational position of the shift rod 67 for providing shift position data to the ECU 102. As may be understood, the shift rod 67 does not have such distinct positions corresponding to the shift positions as does the shift lever 63. As such, this sensor 112*a* generally provides a signal such as that illustrated in FIG. 4, wherein the rotational position of the rod with respect to the sensor 112*a* results in a linear signal output.

A watercraft speed sensor 114 provides data to the ECU 102 regarding the speed of the watercraft 30. An engine coolant temperature sensor 115 provides temperature data to the ECU 102. Preferably, as illustrated in FIG. 3, the sensor 115 is in communication with the coolant in the cooling jacket 93.

Based on the sensor data, the ECU 102 controls an ignition circuit 116 which triggers an ignition coil 118 for firing of a spark plug 120 corresponding to each cylinder 38. In this manner, combustion within each cylinder 28 is controlled.

Preferably, the ECU 102 includes a cylinder disabling control. The ECU 102 is arranged to disable one or more, but not all, of the cylinders 38 when the engine 22 is in at least one mode, preferably an idle mode. This is accomplished by either not firing the spark plug 120 corresponding to one or more cylinders 38, or by advancing or retarding the timing of the firing of the spark plug 120 to such an extent that the combustion does not occur at a time which serves to drive the piston 40 (i.e. misfiring). Preferably, when a particular cylinder 38 is disabled, the ECU 102 is arranged to stop the introduction of fuel to that cylinder 38, such as by controlling the fuel injector 88 which provides fuel thereto.

Most importantly, however, and in accordance with the present invention, the engine control of the present invention is arranged to operate all cylinders 38 when an operating parameter indicates the need for all cylinders to operate, such as by the movement of a shift lever 63.

Figure 6:
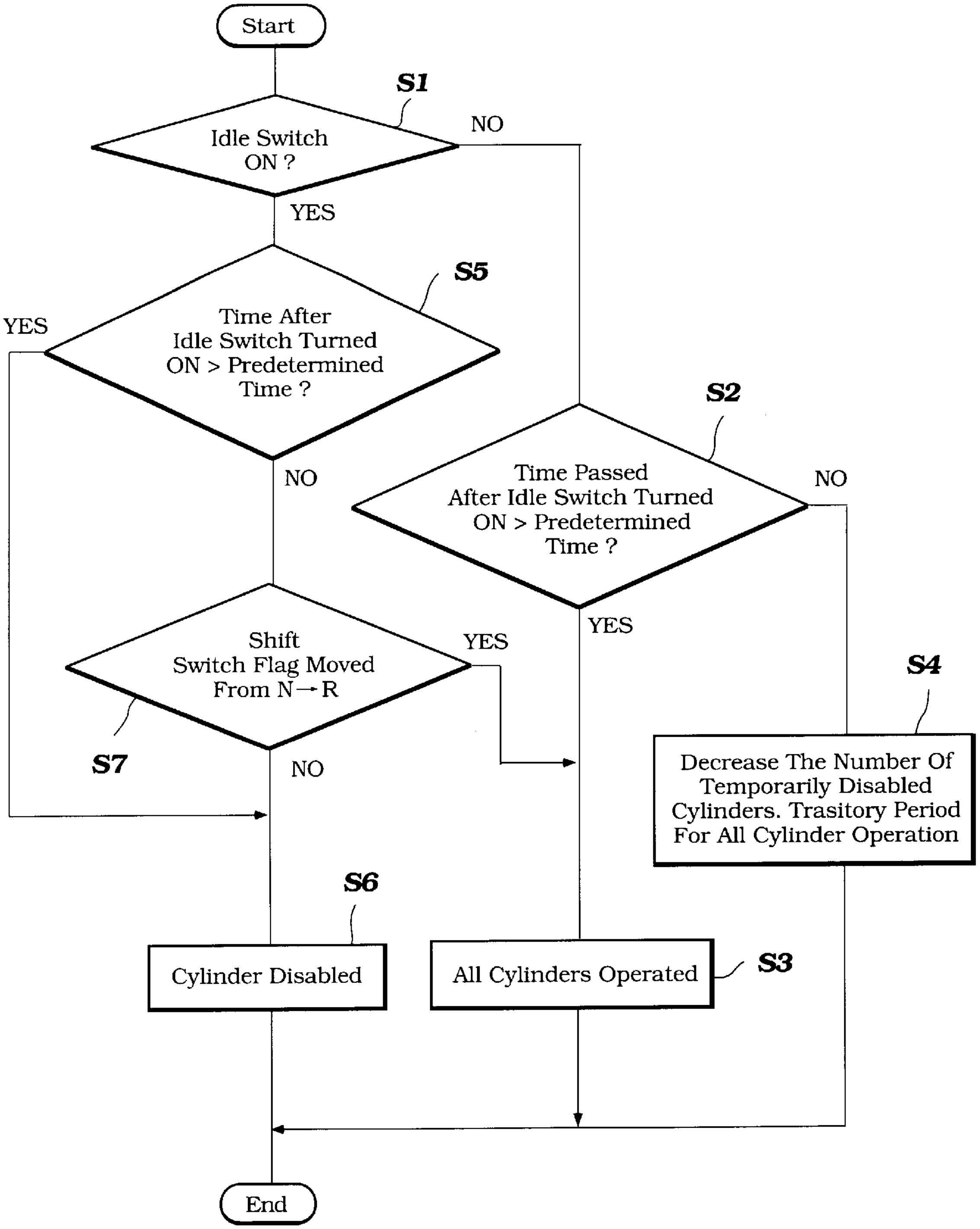
FIG. 6 schematically illustrates a control strategy for the control of the present invention.

A first control strategy is illustrated in FIG. 6. As illustrated, in a first step S1, the ECU 102 checks the idle sensor or switch 104 to determine if the engine 22 is in idle mode. If not, in a step S2 the ECU 102 determines if the time which has passed since the idle switch 104 was turned off is greater than a predetermined time. If not, this indicates the desire to increase engine speed from idle. As described above, the engine 22 of the present arrangement is preferably arranged so that the initial engine speed increase from idle is not accomplish by increasing the angle of the throttle plate 80, but by increasing the number of cylinders which are operating. Thus in a step S4, the ECU 102 decreases the number of cylinders which are temporarily disabled to a point at which all cylinders 38 are operating. Thus, in the event the idle switch is off and has been off for a sufficient period of time, all cylinders 38 of the engine 22 will be operating, as illustrated in step S3.

In the event the idle switch 104 is turned on, in a step S5 the ECU 102 checks to determine if the switch has been turned on for a greater or lesser amount of time than a predetermined amount of time. If the idle switch 104 has been turned on for more than a predetermined amount time, it is determined that the operator intends to idle the engine 22 and thus in a step S6 the ECU 102 disables one or more cylinders.

If the idle switch 104 has been turned on less than a predetermined amount of time, in a step S7 the ECU 102 checks to determine if the shift position sensor 112/112*a* has indicated a shift from neutral to reverse. If not, then it is presumed that the operator intends to idle the engine 22 and thus in the step S6 the ECU 102 employs a cylinder disabling mode.

If so, then it is indicated that the operator wishes to drive the watercraft 24 with the motor 20, and the ECU 102 employs, as indicated in step S3, a mode in which all cylinders are operated. In this manner, the engine 22 provides maximum power to the water propulsion device of the watercraft 30 for propelling it.

In summary, in accordance with the control strategy illustrated in FIG. 6, the engine control employs a cylinder disabling mode. This disabling mode, however, is activated only during certain engine idle conditions. In the event the engine 22 is placed in idle mode only temporarily. In the present invention, such is detected by determining whether the idle condition has existed for a less than a predetermined length of time or whether the operator has moved the shift lever 63 (such as from forward to neutral and then to reverse). In either event, the cylinder disabling mode is prevented since it is determined that it is not the desire of the operator to actually run the engine 22 at idle but to have the engine provide increased power.

This strategy permits the engine 22 to run in a disabling mode when idling to reduce fuel consumption and engine operating temperature. At the same time, all cylinders of the engine 22 are arranged to operate to propel the water propulsion device, preventing engine stalling and the like during acceleration of the watercraft 30.

Figure 7:
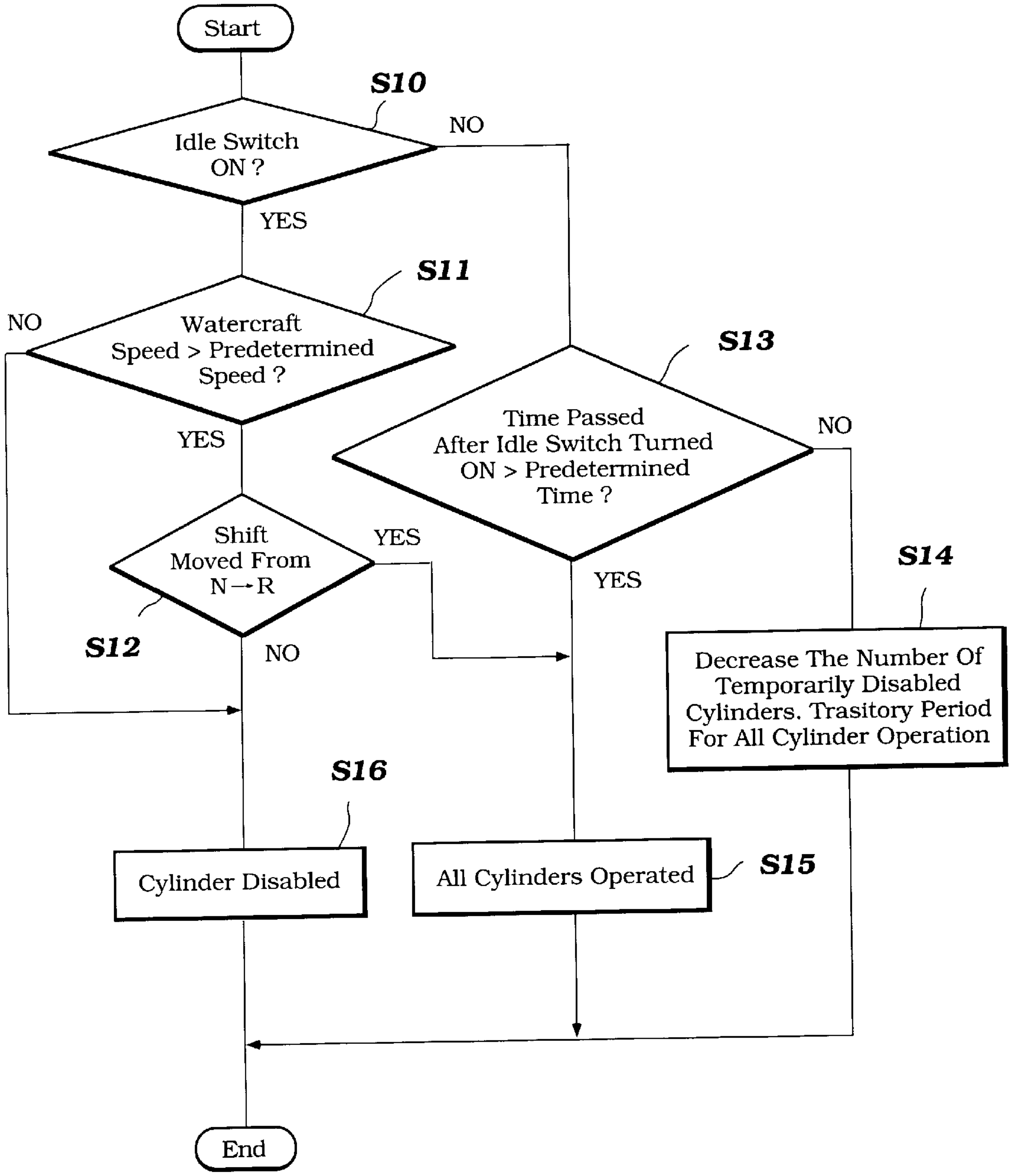
FIG. 7 schematically illustrates another control strategy for the control of the present invention.

An alternate control arrangement is illustrated in FIG. 7. The control strategy of this embodiment is similar to that illustrated in FIG. 6. In this embodiment, step S11 is provided in the alternative to step S5 of the control strategy illustrated in FIG. 6. In particular, instead of checking to see if the idle switch 104 has been turned on longer than a predetermined time to verify that an engine idle mode is desired as in step S5 of FIG. 6, in step S11 of FIG. 7 the ECU 102 determines if the speed of the watercraft 30 is larger or higher than a predetermined speed. If the speed is lower than a predetermined speed, it is presumed that the idle condition is desired and the ECU 102 operates the engine 22 in a cylinder disabling mode (step S16). On the other hand, if the watercraft speed is higher than the predetermined speed and the shift lever 63 has been moved from a neutral to reverse position (step S12), then it is known that the operator desires the engine 22 to provide maximum propeller rotation in the reverse direction to slow the watercraft 30, requiring maximum engine power and thus the operation of all cylinders (step S15).

Of course, the control strategy illustrated in FIGS. 6 and 7 and described above could be arranged in the same manner with respect to a shift lever 63 movement from the neutral to the forward position. In other words, in steps S7 and S12, the ECU 102 would determine in the shift lever 63 has moved from the neutral to the forward position instead of the neutral to reverse position. Also, the control may be arranged to determine if the shifter has been moved to either the forward or reverse positions from neutral in these steps, and if so, operating all cylinders of the engine.

Of course, the foregoing description is that of preferred embodiments of the invention, and various changes and modifications may be made without departing from the spirit and scope of the invention, as defined by the appended claims.

What is claimed is:

1. An engine control for an internal combustion engine having a plurality of cylinders and driving a load through a transmission having at least a load driving operating condition and a non-load driving operating condition, said engine being operable in an idle condition and a non-idle condition, said engine control including means for operating said engine in a first mode in which all cylinders are operating and a second mode in which at least one of said cylinders is disabled, said engine control arranged to operate said engine in said second mode both when said transmission non-load driving operating condition does not change to a said load driving operating condition and when said engine idle condition has existed for a more than a first predetermined amount of time and for returning the operation to said first mode both when said transmission is changed to said load driving operating condition and when said engine condition has been changed from said idle condition to said non-idle condition for more than a second predetermined amount of time.

2. The engine control in accordance with claim 1, wherein said load comprises a water propulsion device of a water vehicle in forward or reverse drive states or a neutral non-drive state.

* * * * *